(12) United States Patent
Weatherby, III et al.

(10) Patent No.: US 11,235,693 B2
(45) Date of Patent: Feb. 1, 2022

(54) DYNAMIC UTILITY TRANSPORT SYSTEM

(71) Applicant: The Weatherby Group, LLC, Gray, TN (US)

(72) Inventors: Albert Stanley Weatherby, III, Gray, TN (US); Michael Preson Brackins, Chuckey, TN (US); Tyler Zachary Rice, Gray, TN (US)

(*) Notice: Subject to any disclaimer, the term of this patent is extended or adjusted under 35 U.S.C. 154(b) by 55 days.

(21) Appl. No.: 16/252,752

(22) Filed: Jan. 21, 2019

(65) Prior Publication Data
US 2020/0231080 A1   Jul. 23, 2020

(51) Int. Cl.
| | | |
|---|---|---|
| *B60P 1/64* | (2006.01) | |
| *B62D 53/08* | (2006.01) | |
| *B60S 9/02* | (2006.01) | |
| *B60P 7/13* | (2006.01) | |

(52) U.S. Cl.
CPC .......... *B60P 1/6418* (2013.01); *B60P 1/6409* (2013.01); *B60P 1/6481* (2013.01); *B60P 7/13* (2013.01); *B60S 9/02* (2013.01); *B62D 53/0842* (2013.01)

(58) Field of Classification Search
CPC ..... B60P 1/6472; B60P 1/6481; B60P 1/6418; B60P 1/6409; B60P 7/13
USPC ................................................. 414/498
See application file for complete search history.

(56) References Cited

U.S. PATENT DOCUMENTS

| | | | | |
|---|---|---|---|---|
| 6,062,806 A | * | 5/2000 | Kern ..................... | B60P 1/6454 414/376 |
| 2006/0099045 A1 | * | 5/2006 | Sawchuk ................. | B60P 7/13 410/103 |
| 2007/0292250 A1 | * | 12/2007 | Born ..................... | B60P 1/6481 414/467 |
| 2017/0021318 A1 | * | 1/2017 | McIver .................. | B65D 88/30 |

* cited by examiner

*Primary Examiner* — Saul Rodriguez
*Assistant Examiner* — Willie Berry, Jr.
(74) *Attorney, Agent, or Firm* — Robinson IP Law, PLLC

(57) ABSTRACT

A container transport system for transporting an intermodal freight container includes: a tow assembly pivotally coupled to a tow vehicle, the tow assembly including a support frame, a boom assembly mounted on the support frame, the boom assembly having a boom frame and a lifting actuator mounted on the boom frame; a lift beam shaped to attach to an end of the intermodal freight container, the lift beam mechanically associated with the lifting actuator; a dolly removably coupled to one of the tow assembly and tow vehicle, the dolly including a bogey frame including a plurality of wheels attached to the bogey frame, a pair of brackets located on sides of the bogey frame, the brackets spaced apart such that a width of the intermodal freight container fits between the paid of brackets.

16 Claims, 25 Drawing Sheets

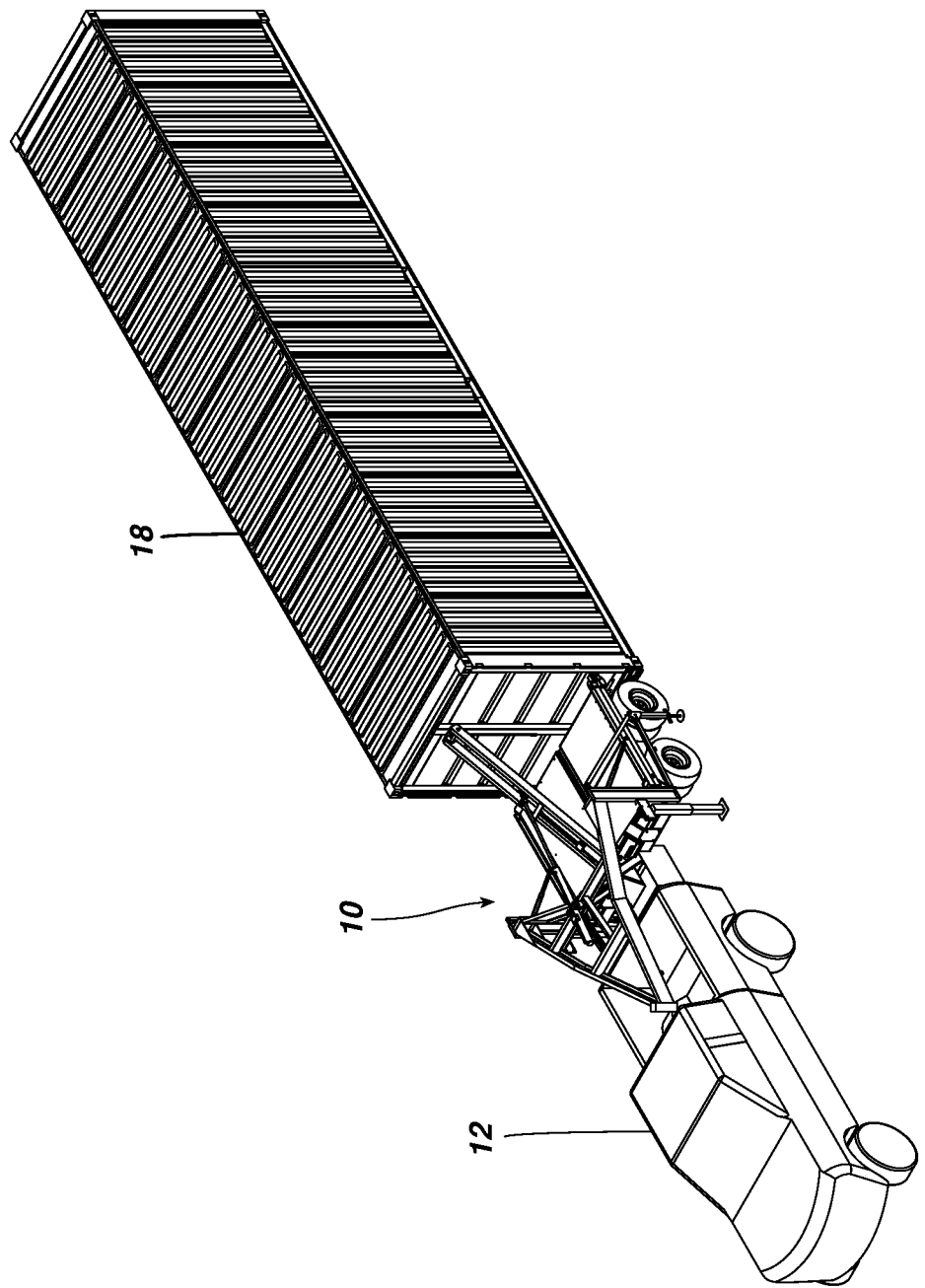

DYNAMIC UTILITY TRANSPORT SYSTEM

FIELD

The present invention relates to transportation. More specifically, the present application describes a transport system adapted to enable efficient transportation of an intermodal shipping container with the ability to adapt to use special attachments creating multiple transport systems, such as, a tilt bed flat deck trailer, a utility dump bed trailer, and other special utility uses.

BACKGROUND

In addition to their primary use for the transportation of goods, intermodal shipping containers (also known as CONEX boxes or container) are known to provide extremely secure storage structures. A break-in generally requires a cutting tool or blow torch. While secure, even small intermodal shipping containers weights several thousand pounds. As a result, one of a special tilt-bed roll-off truck, a small crane, or a large forklift is generally required to move and position such containers. Further, transportation of even empty containers is virtually limited to semi-trailer type trucks aided by loading equipment at an end of the journey. Even if such trucking facilities are available, transportation of a substantially empty intermodal shipping container with large specialized equipment is extremely wasteful and inefficient, particularly with respect to fuel consumption.

With the shortcomings of the prior design clearly in mind, it is an object of the present disclosure to improve over previous designs by providing a safe and effective dynamic utility transport system. Embodiments disclosed herein enable a medium duty truck to be utilized for efficient transport of a substantially empty intermodal shipping container. It is an object of the present invention to provide such a dynamic utility transport system that also allows for picking up and placing containers and attachments. Still further, it is an object of the present disclosure to provide a fully hydraulic and or partially electric and or partially electric dynamic utility transport system that is capable of picking up and placing containers and attachment systems, with the most limited access to sides of the container, thereby accommodating containers that cannot be handled by forklifts. The dynamic utility transport system described herein is adapted to meet the ever changing needs of the medium duty truck shipping industry.

SUMMARY

The above and other needs are met by a container transport system for transporting an intermodal freight container with a medium duty truck. In a first aspect, a container transport system includes: a tow assembly pivotally coupled to a tow vehicle, the tow assembly including a support frame, a boom assembly mounted on the support frame, the boom assembly having a boom frame and a lifting actuator mounted on the boom frame; a lift beam shaped to attach to an end of the intermodal freight container, the lift beam mechanically associated with the lifting actuator; a dolly removably coupled to one of the tow assembly and tow vehicle, the dolly including a bogey frame including a plurality of wheels attached to the bogey frame and a pair of brackets located on sides of the bogey frame, the brackets spaced apart such that a width of the intermodal freight container fits between the paid of brackets.

In one embodiment, the boom assembly is pivotally mounted on the support frame and the tow assembly further includes a boom actuator mounted between the support frame and the boom assembly.

In another embodiment, the tow assembly further includes a gooseneck coupler located on the support frame for engaging a gooseneck hitch of the tow vehicle.

In yet another embodiment, the tow assembly further includes a pair of outrigger supports mounted on sides of the support frame for stabilizing the support frame during lifting of the intermodal freight container. In one embodiment, the tow assembly further comprising a pair of landing legs. The tow assembly is supported by the pair of outrigger supports and the pair of landing legs when not attached to the tow vehicle or the intermodal freight container.

In another embodiment, the boom assembly further includes a pulley located on a distal end of the boom assembly and a cable attached between the lifting actuator and the lift beam, wherein the cable extends over the pulley.

In yet another embodiment, the dolly further includes one or more winches and a winch for moving the dolly under the intermodal freight container for transport. In one embodiment, the dolly further includes one or more rollers located along a back edge of the dolly for contacting a bottom of the intermodal freight container during loading and unloading of the intermodal freight container.

In another embodiment, the lift beam further includes a pair of pins located on ends of the lift beam, the pair of pins shaped to engage corner casings of the intermodal freight container.

In yet another embodiment, the container transport system further includes a flatbed assembly having a plurality of corner casings, wherein the flat bed assembly is removably attached to the tow assembly and the dolly. In one embodiment, the container transport system further includes a dump bed assembly having a plurality of corner casings, wherein the dump bed assembly is removably attached to the tow assembly and the dolly.

In a second aspect, a container transport system for transporting an intermodal freight container includes: a tow assembly pivotally coupled to a tow vehicle, the tow assembly including a support frame, a boom assembly pivotally mounted on the support frame, the boom assembly having a boom frame, a lifting actuator mounted on the boom frame, a pulley located at a distal end of the boom frame, and a lifting cable attached to the lifting actuator and located around the pulley; a lift beam attached to an end of the lifting cable, the lift beam shaped to attach to an end of the intermodal freight container, the lift beam mechanically associated with the lifting actuator; a dolly removably coupled to one of the tow assembly and tow vehicle, the dolly including a bogey frame including a plurality of wheels attached to the bogey frame and a pair of brackets located on sides of the bogey frame, the brackets spaced apart such that a width of the intermodal freight container fits between the paid of brackets.

In one embodiment, the tow assembly further includes a gooseneck coupler located on the support frame for engaging a gooseneck hitch of the tow vehicle.

In another embodiment, the tow assembly further includes a pair of outrigger supports mounted on sides of the support frame for stabilizing the support frame during lifting of the intermodal freight container.

In yet another embodiment, the dolly further includes one or more winches and a winch for moving the dolly under the intermodal freight container for transport.

In one embodiment, the dolly further includes one or more rollers located along a back edge of the dolly for contacting a bottom of the intermodal freight container during loading and unloading of the intermodal freight container.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 20A and 20B show a first step of loading an intermodal container onto a container transport system according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

As referred to herein, an intermodal container or CONEX box refers to well-known shipping containers provided in one or more standardized sizes that are used across a variety of modes of transportation, such as ship, rail, or truck containers. Intermodal containers are configured to store a variety of materials and products within the intermodal containers for transport.

Figure 1:
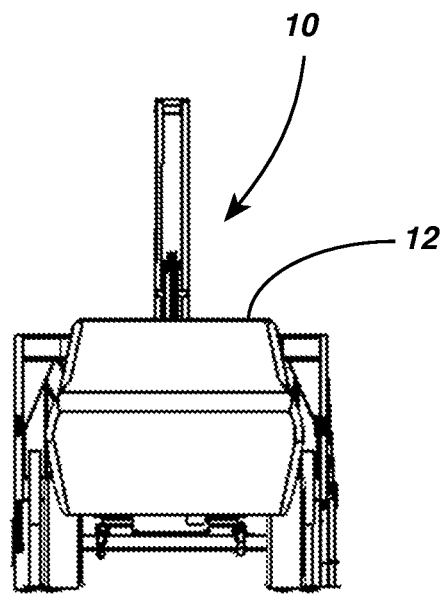
FIG. 1 shows a front view of a vehicle and container transport system according to one embodiment of the present disclosure.
Figure 2:
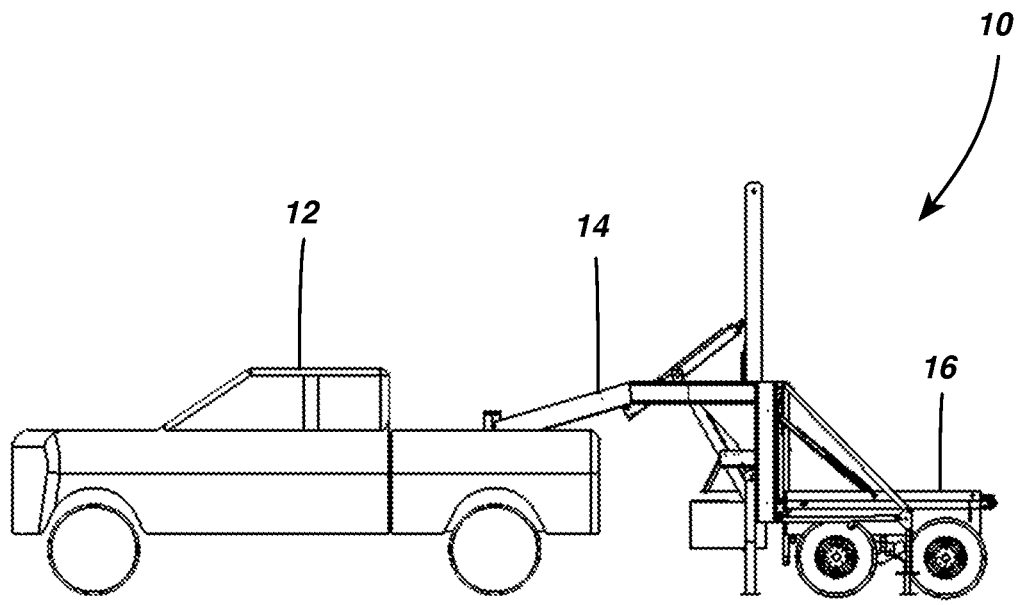
FIG. 2 shows a side view of a vehicle and container transport system according to one embodiment of the present disclosure.
Figure 3:
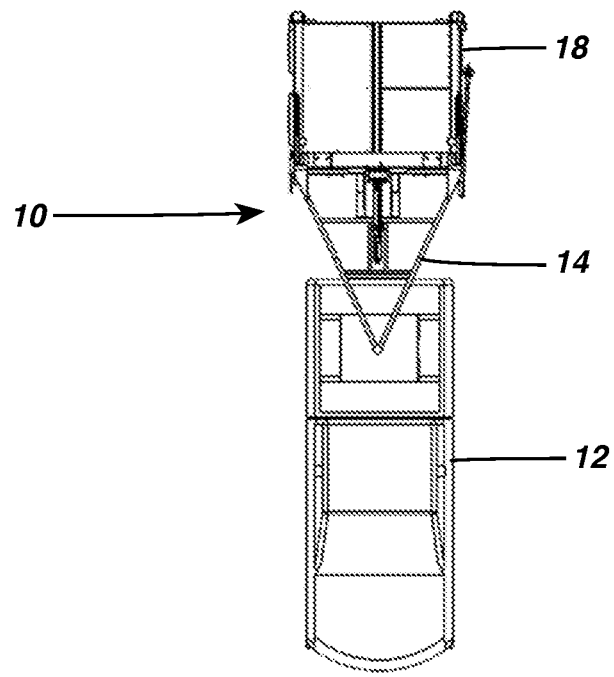
FIG. 3 shows a top view of a vehicle and container transport system according to one embodiment of the present disclosure.
Figure 4:
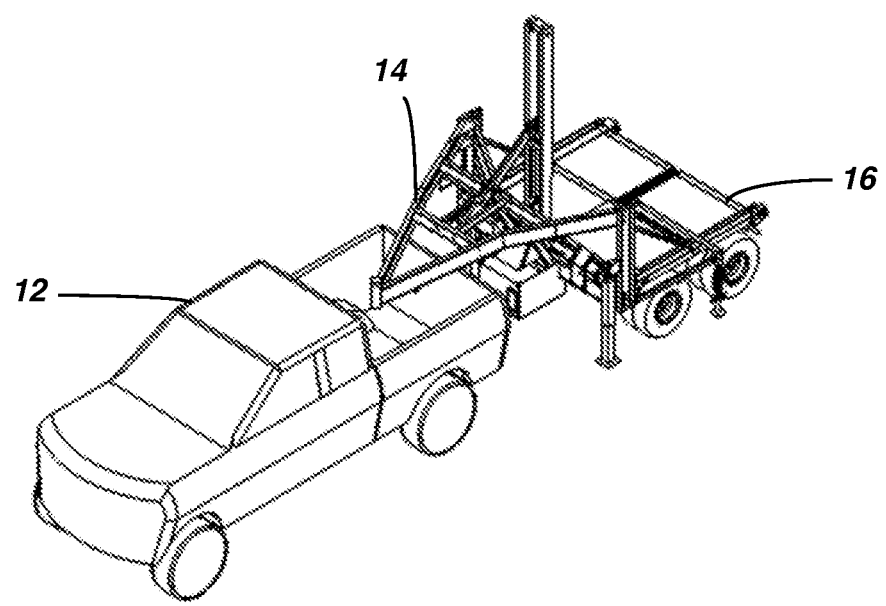
FIG. 4 shows a perspective view of a vehicle and container transport system according to one embodiment of the present disclosure.
Figure 5:
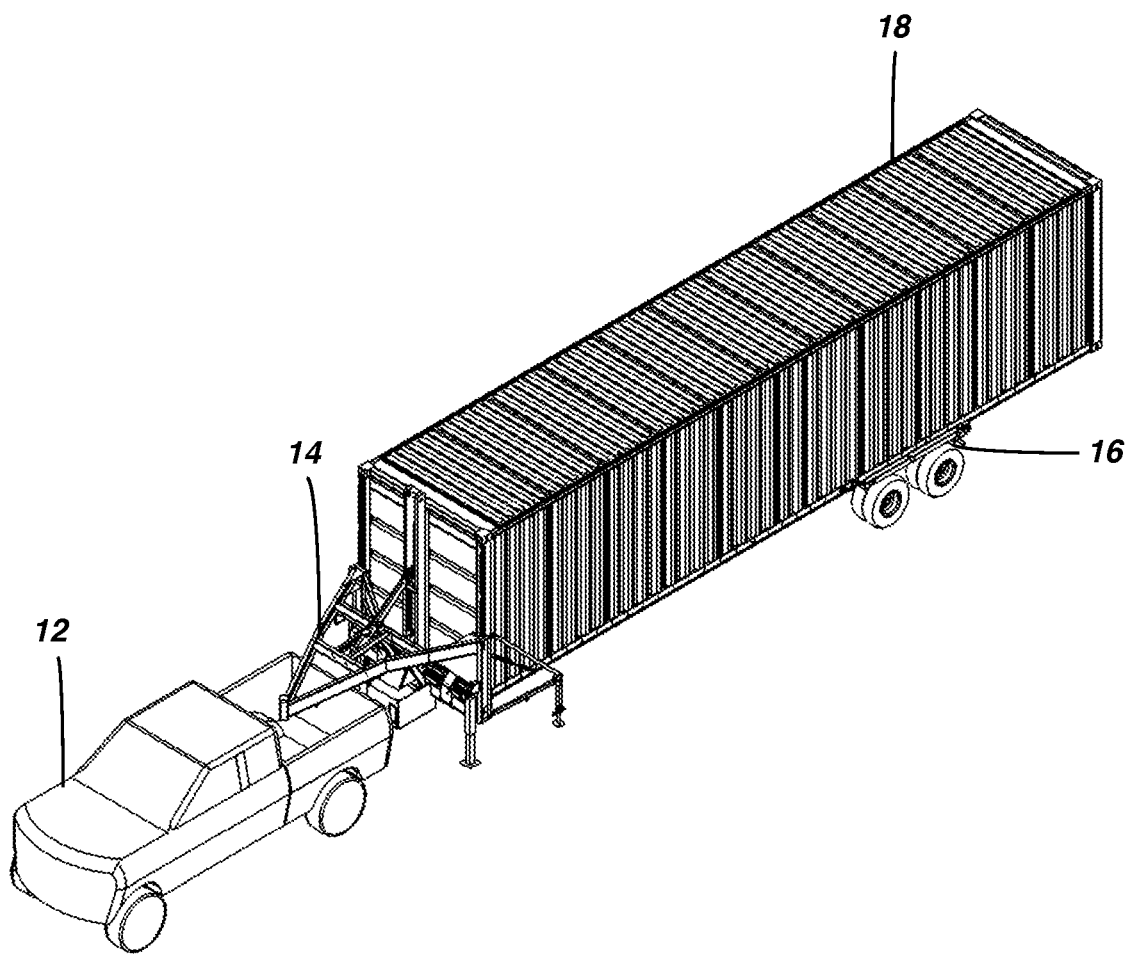
FIG. 5 shows a perspective view of a vehicle hauling an intermodal container using a container transport system according to one embodiment of the present disclosure.

FIGS. 1-4 illustrate a basic embodiment of a container transport system 10 adapted to tow an intermodal shipping container behind a vehicle 12, preferably a medium duty truck. The container transport system 10 includes a tow assembly 14 adapted for towing by the vehicle 12, and a dolly 16 adapted for supporting a weight of an intermodal freight type shipping container, as referred to in greater detail below. Referring to FIG. 5, the container transport system 10 allows for both the lifting and placing of an intermodal container 18 onto the tow assembly 14 and the dolly 16 and for the towing of the intermodal container 18 by the vehicle 12.

Figure 6:
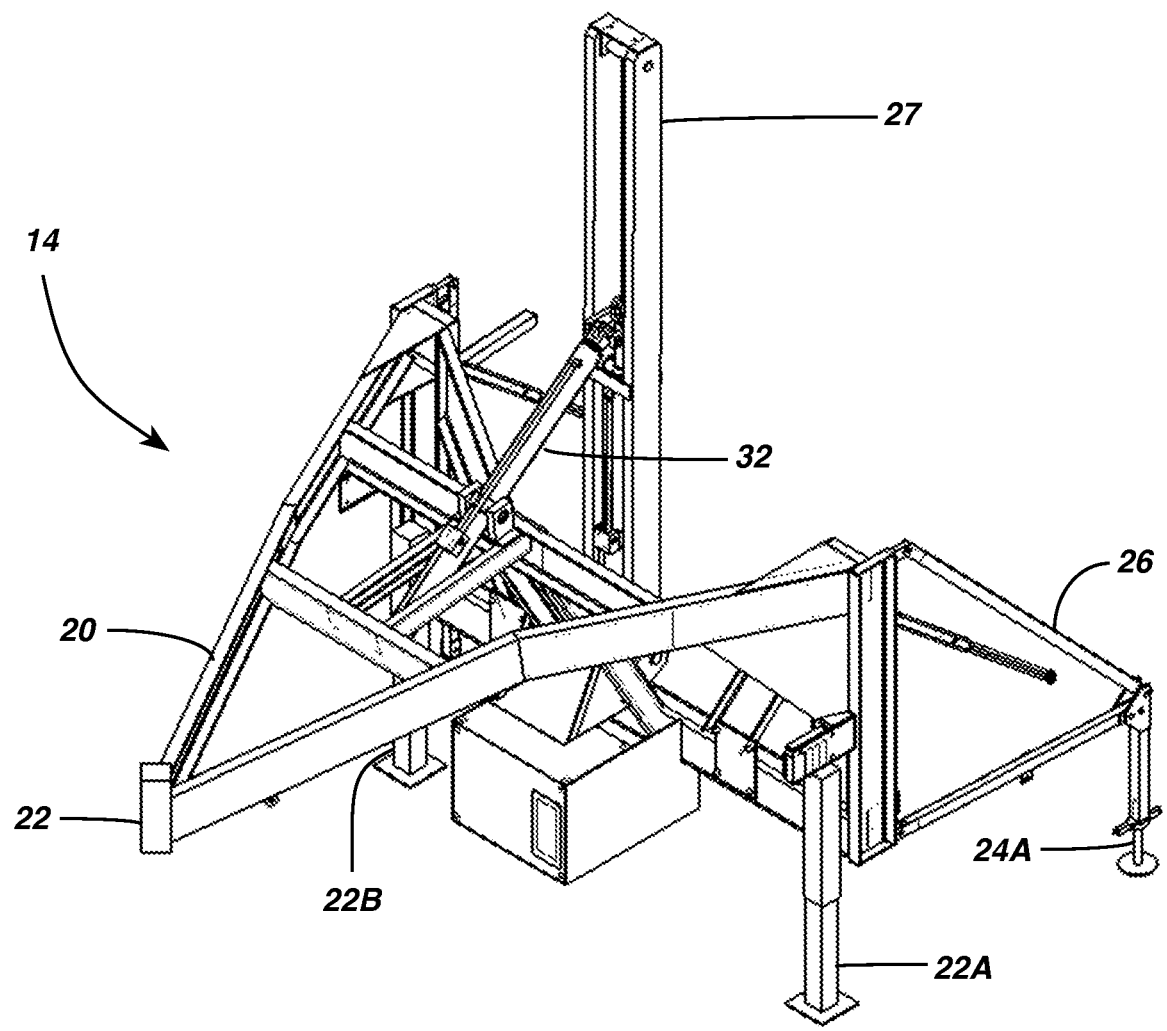
FIGS. 6-9 show a tow assembly of a container transport system according to one embodiment of the present disclosure.
Figure 7:
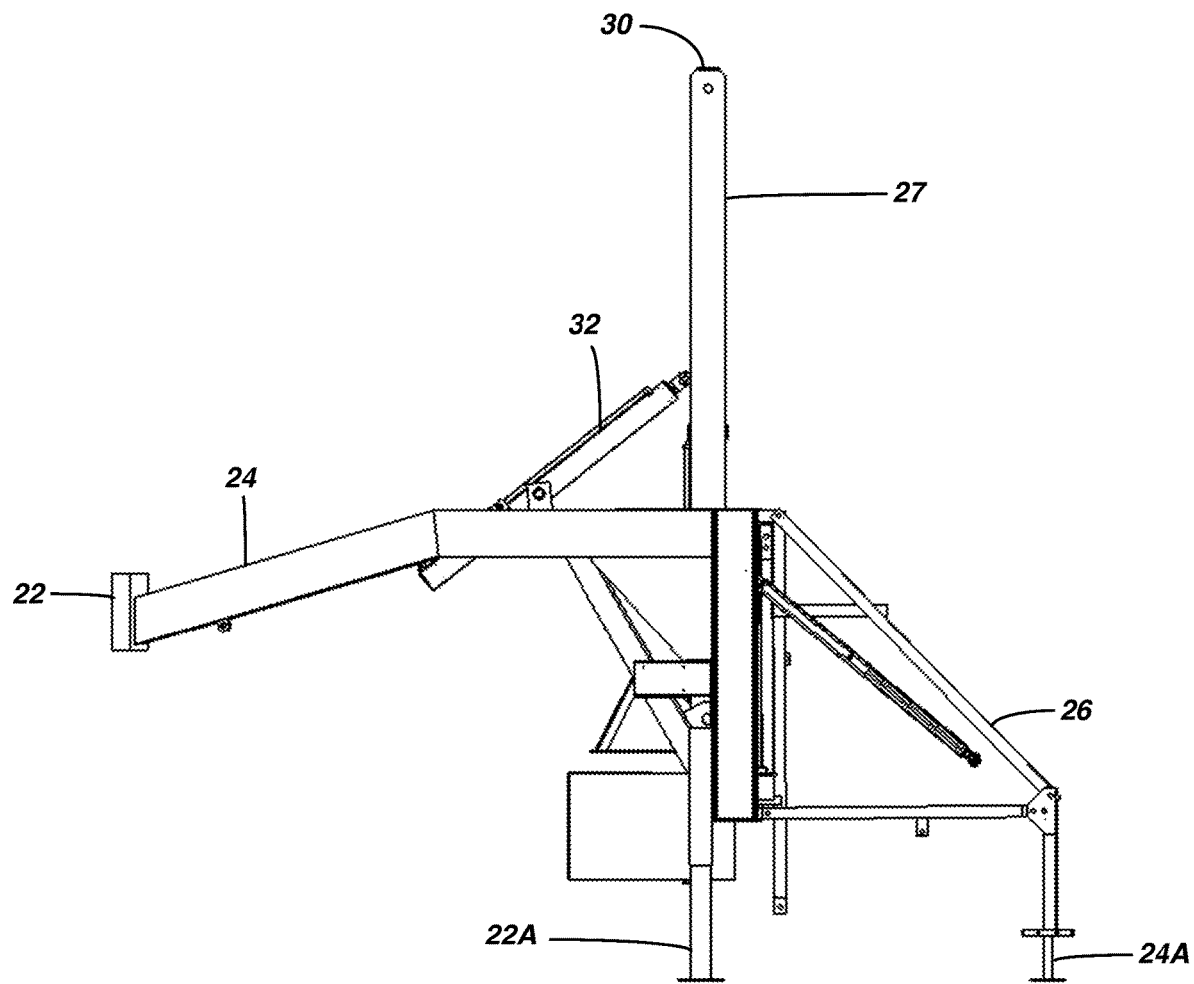
Figure 8:
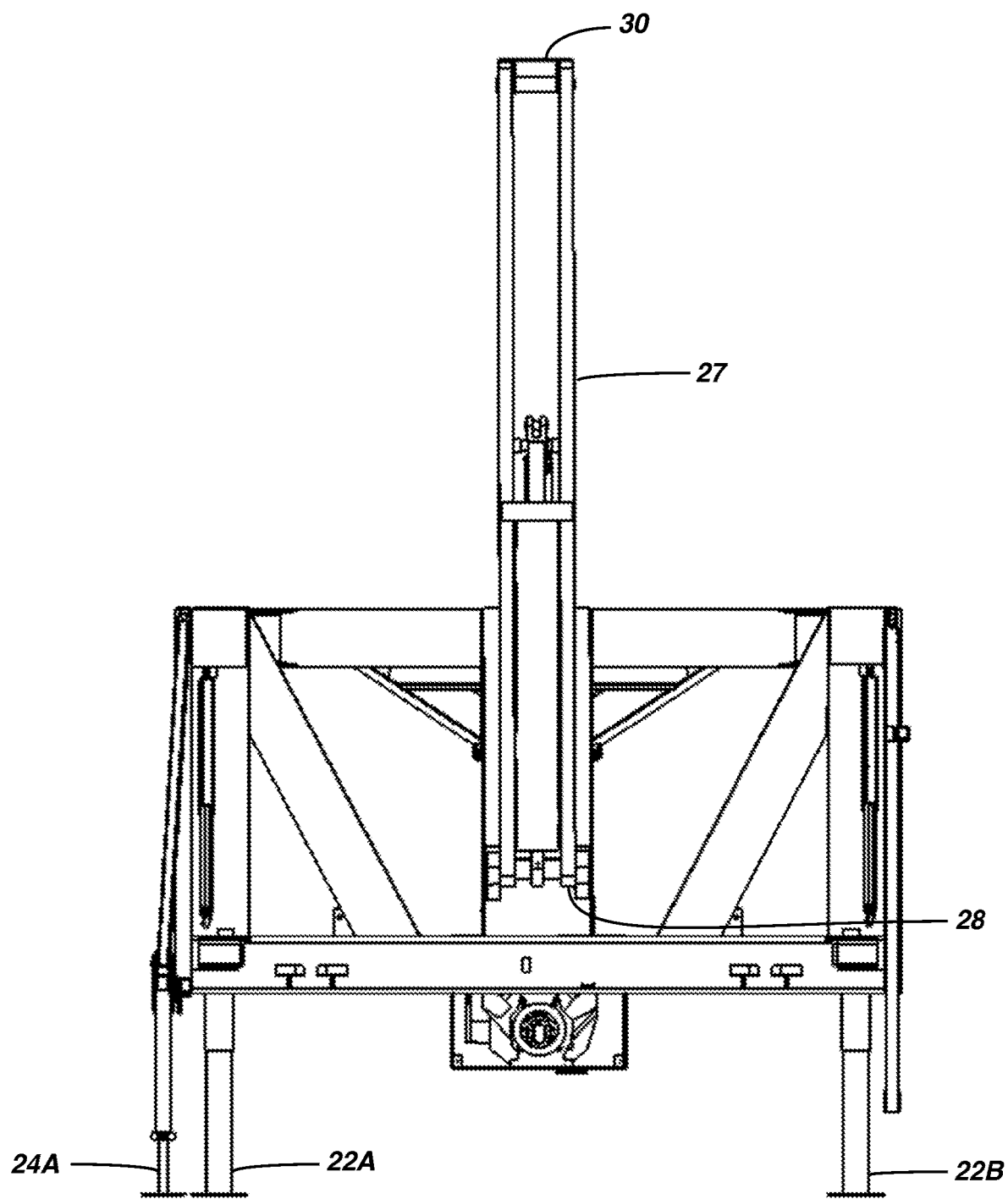

Referring to FIGS. 6-9, the tow assembly 14 is connected to the vehicle 12 for towing of the intermodal container 18 (FIG. 5) when the intermodal container is mounted on the tow assembly 14 and dolly 16. The tow assembly 14 is preferably connected to the vehicle 12 such that the intermodal container 18 is capable of pivoting with respect to the vehicle 12 during towing of the intermodal container 18. As shown in FIG. 6, the tow assembly 14 preferably includes a gooseneck frame 20 attached to the tow assembly 14. The gooseneck frame 20 includes a gooseneck coupler 23 located at an end of the gooseneck frame 20 for removably connecting the tow assembly 14 to the vehicle 12, such as to a gooseneck hitch mounted on the vehicle 12. While the tow assembly 14 is preferably connected to the vehicle 12 with the gooseneck coupler 22, it is also understood that the tow assembly may be otherwise connected to the vehicle 12 for supporting the intermodal container 18 on the vehicle 12. For example, the tow assembly 14 may be directly mounted onto or otherwise incorporated with the vehicle 12.

The tow assembly 14 further includes a pair of outrigger supports 22A and 22B for supporting the tow assembly 14 during lifting of the intermodal container 18 as described in greater detail below. Each of the pair of outrigger supports 22A and 22B is preferably adjustable such that the outrigger supports 22A and 22B may be moved between stowed positions during transportation and deployed positions for supporting the tow assembly 14 during loading of the intermodal container 18. The tow assembly 14 also preferably includes a pair of landing legs 24A and 24B attached to a support frame 26 of the tow assembly 14. The pair of landing legs 24A and 24B are also preferably movable between stowed and deployed positions. The pair of landing legs 24A and 24B enable the tow assembly 14 to be substantially free-standing when the tow assembly 14 is not connected to the vehicle 12. The outrigger supports 22A and 22B and the landing legs 24A and 24B are preferably hydraulically actuated for moving between stowed and deployed positions.

Figure 9:
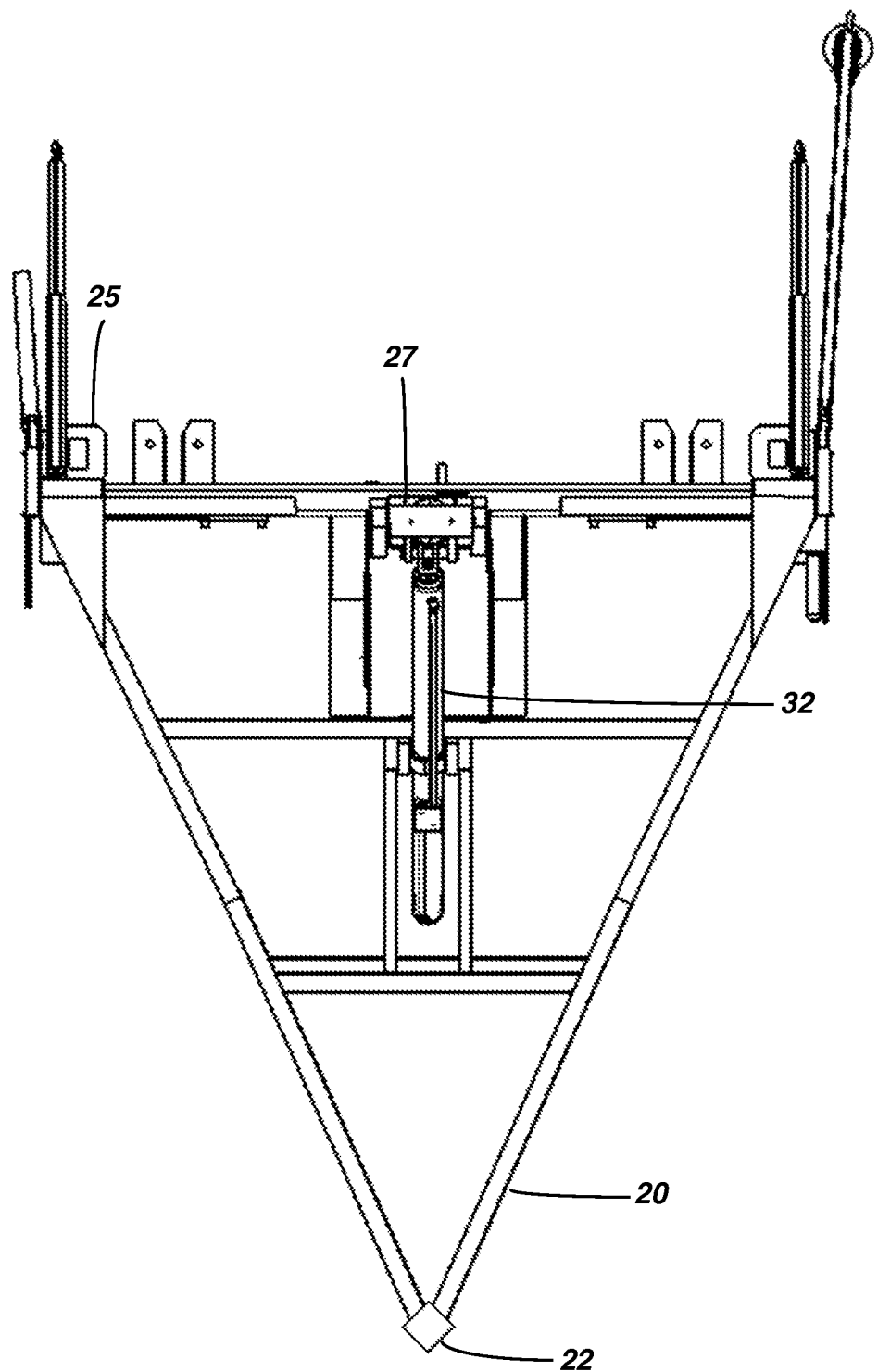

As shown in FIG. 9, the tow assembly 14 includes one or more tabs 25 for supporting an end of the intermodal container 18 during transport, as described in greater detail below. The tabs 25 may engage a lower end of the intermodal container 18 to secure the intermodal container 18 to the tow assembly 14 during transport of the intermodal container 18.

The tow assembly 14 further includes a boom assembly 27 mounted on the tow assembly 14 for lifting at least a portion of the intermodal container 18. The boom assembly 27 includes a first end 28 and a second end 30 that is distal from the first end 28. The boom assembly 27 is pivotally mounted on the tow assembly 14 at the first end 28 of the boom assembly 27. A boom actuator 32 is pivotally mounted to the tow assembly 14, such as to the gooseneck frame 20 of the tow assembly 14. An end of the boom actuator 32 is attached to the boom assembly 27 for pivoting the boom assembly 27 as described in greater detail below.

Figure 10:
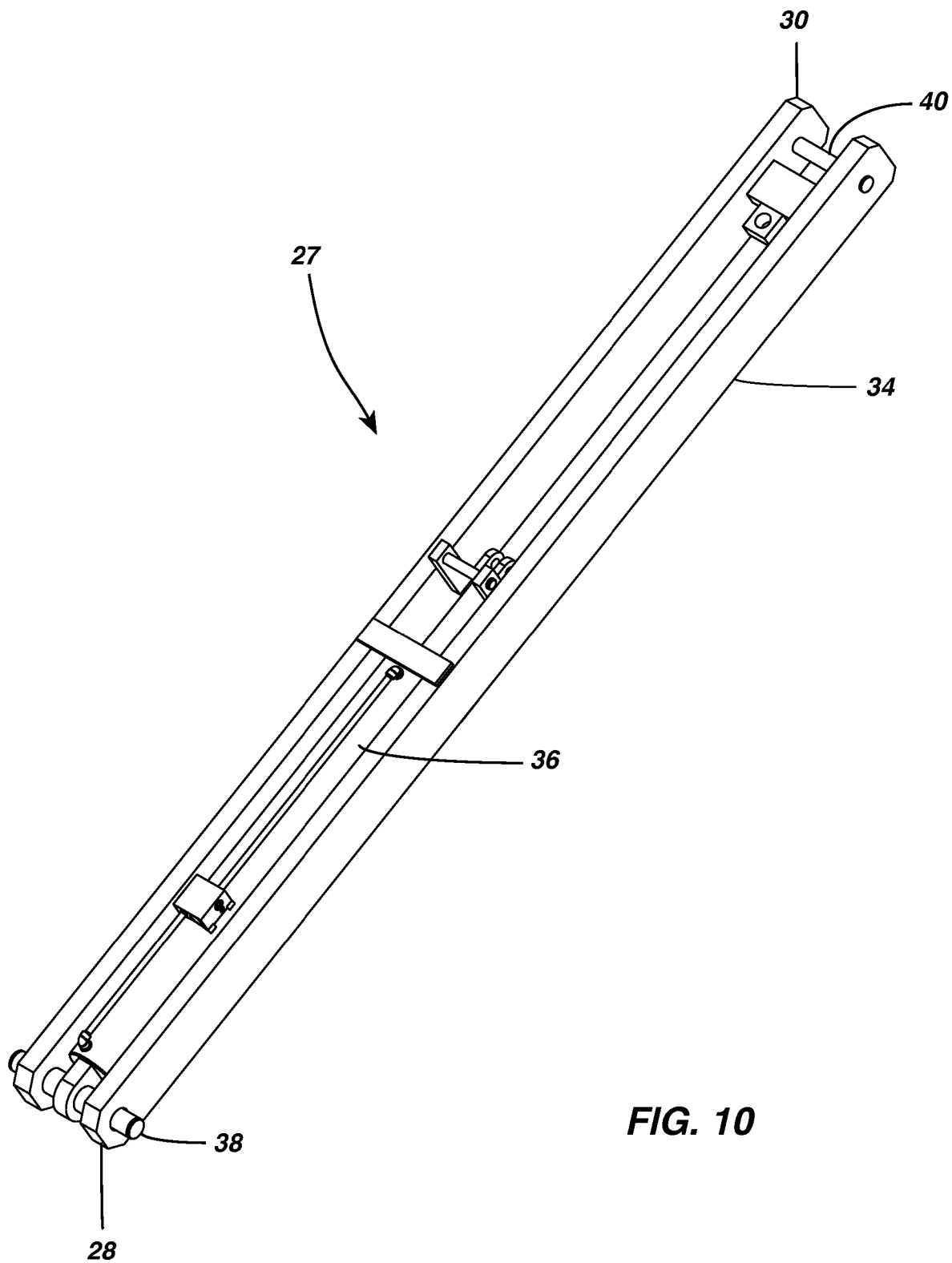
FIGS. 10-12 show a boom assembly of a container transport system according to one embodiment of the present disclosure.
Figure 11:
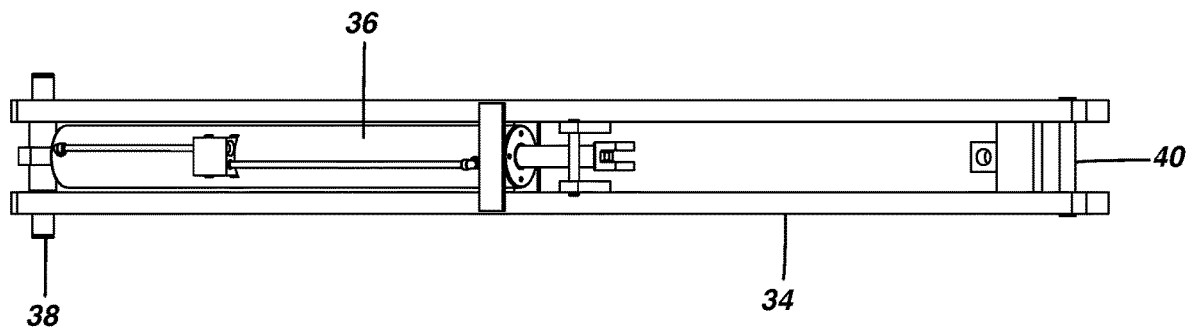
Figure 12:
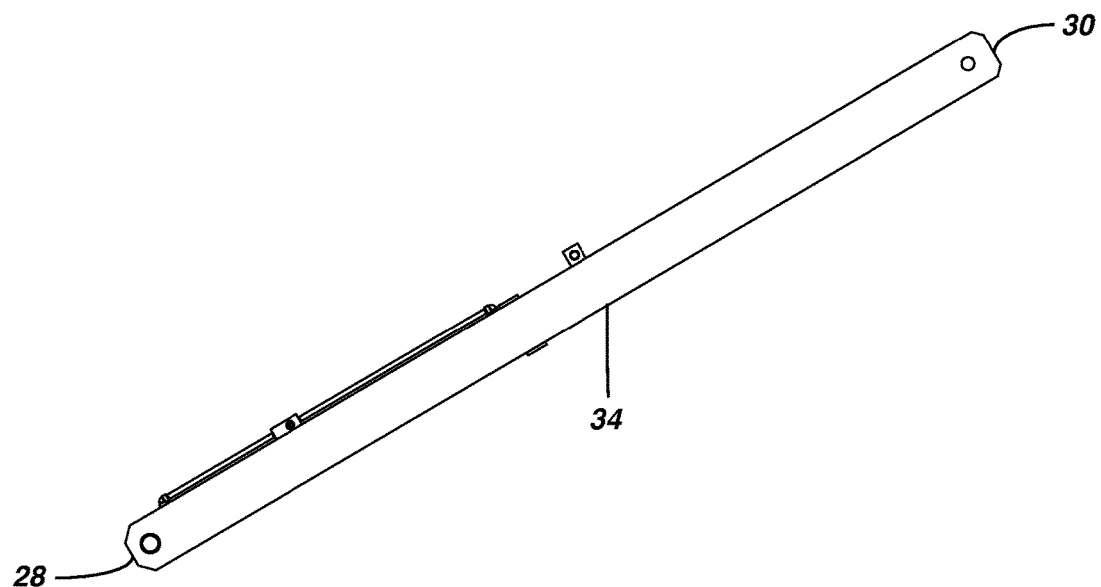

Referring to FIGS. 10-12, the boom assembly 27 includes a boom frame 34 and a lifting actuator 36 mounted on the boom frame 34. The lifting actuator 36 is preferably a linear actuator and is more preferably a hydraulic linear actuator or ram as shown in FIGS. 10-12. However, it is also understood that other various actuators may be suitable as the lifting actuator 36. As shown in FIGS. 10-12, the boom frame 34 preferably includes a pair of elongate frame members with the lifting actuator 36 mounted between the elongate frame members. The boom assembly 27 includes a pivot shaft 38 located at the first end 28 of the boom assembly 27. The pivot shaft 38 extends through the first end 28 of the boom assembly 27 and through an end of the lifting actuator 36. The boom assembly 27 is attached to the tow assembly 14 at the pivot shaft 38 such that the boom assembly 27 pivots with respect to the tow assembly 14. The boom assembly 27 further includes a pulley shaft 40 located at the second end 30 of the boom assembly 27 for supporting a pulley as described in greater detail below.

Figure 13:
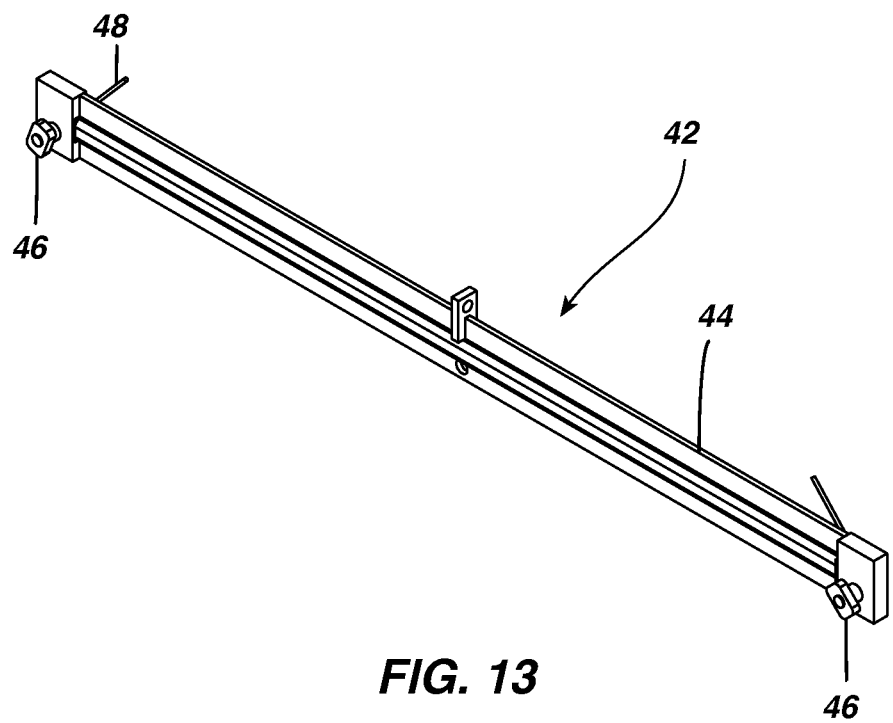
FIGS. 13-15 show a lift beam of a container transport system according to one embodiment of the present disclosure.
Figure 14:
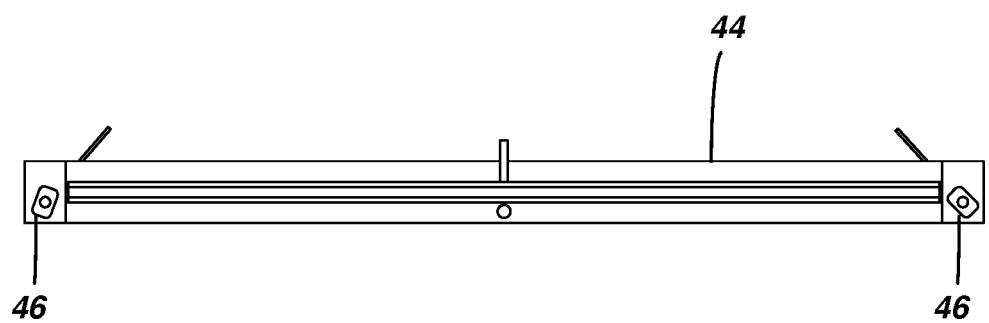
Figure 15:
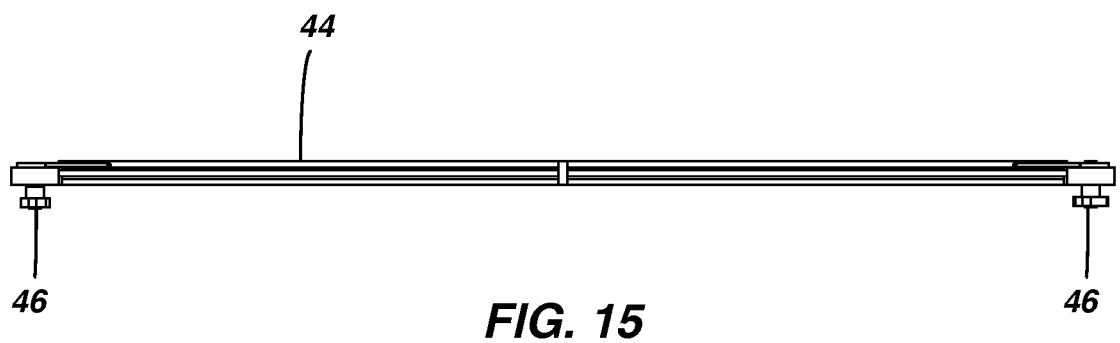

Referring now to FIGS. 13-15, the container transport system 10 includes a lift beam 42 shaped to attach to an end of the intermodal container 18. The lift beam 42 includes an elongate member 44 having a length that is approximate to a width of the intermodal container 18. The lift beam 42 includes a pair of pins 46 shaped to connect to the intermodal container 18, such as through corner fittings or castings commonly located at corners of the intermodal container 18. The pins 46 are shaped to removably attach the lift beam 42 to an end of the intermodal container 18 for lifting the end of the intermodal container as described herein. The lift beam 42 is supported from the boom assembly 27 with cable 48 attached at ends of the lift beam 42. The cable 48 preferably extends around the pulley shaft 40 and is attached at an opposite end to the lifting actuator 36.

Figure 16:
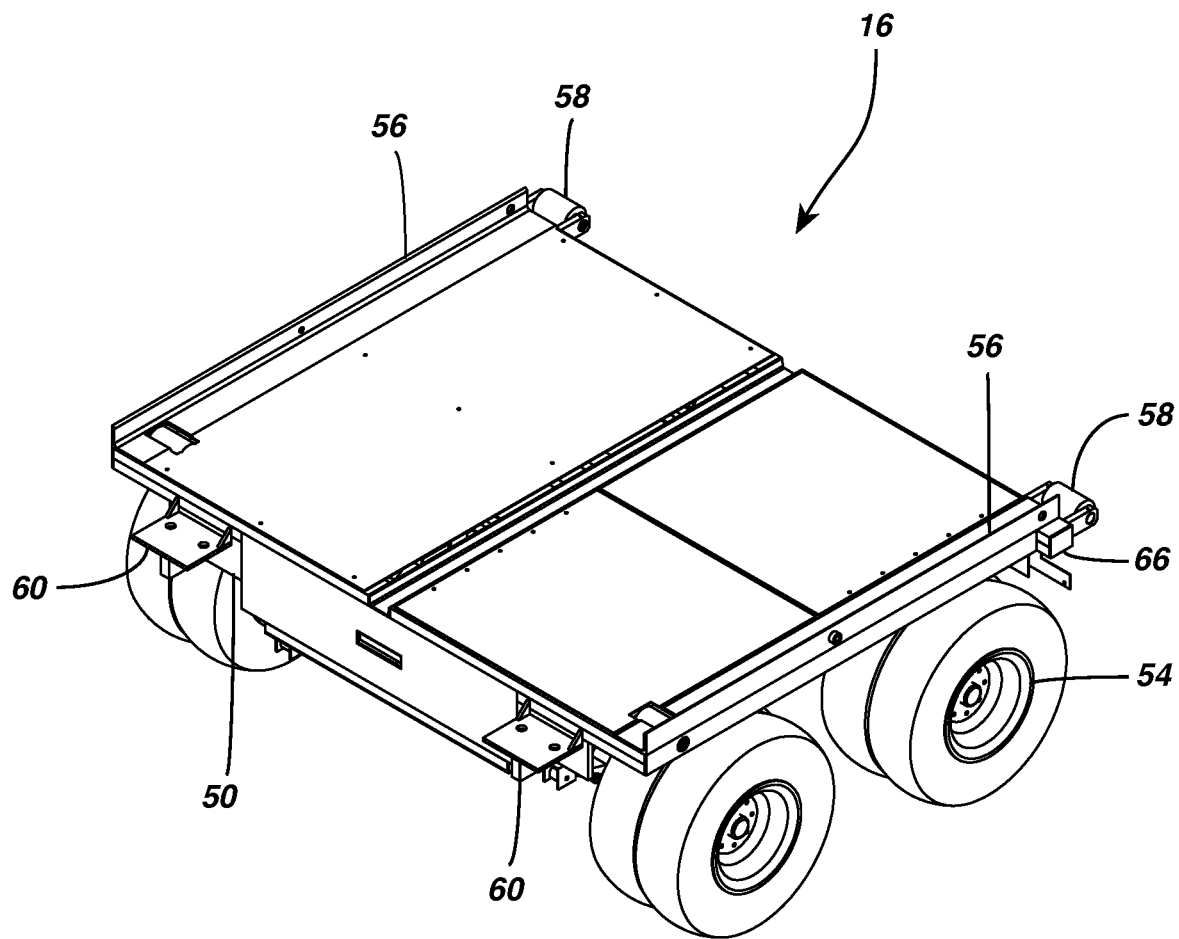
FIGS. 16-19 show a dolly of a container transport system according to one embodiment of the present disclosure.
Figure 17:
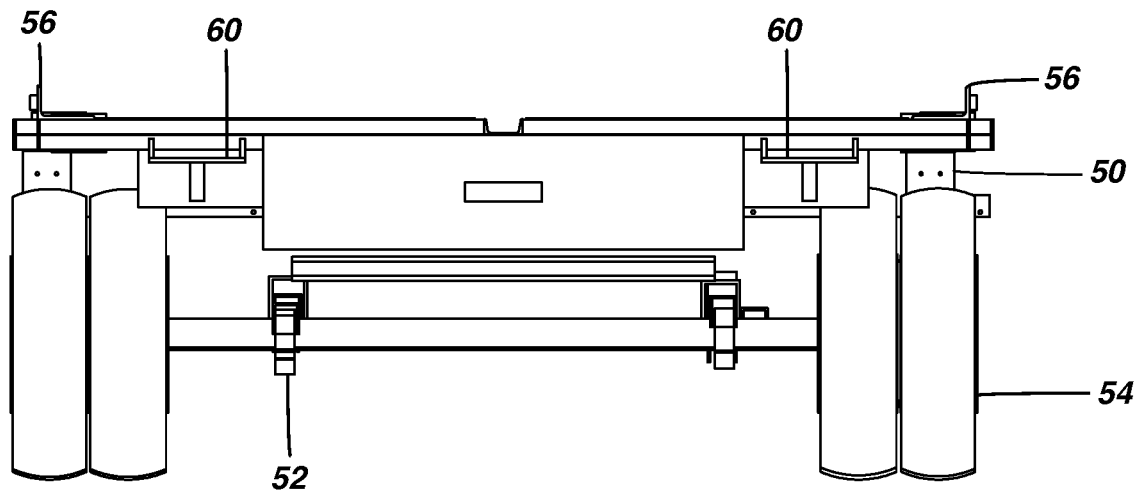
Figure 18:
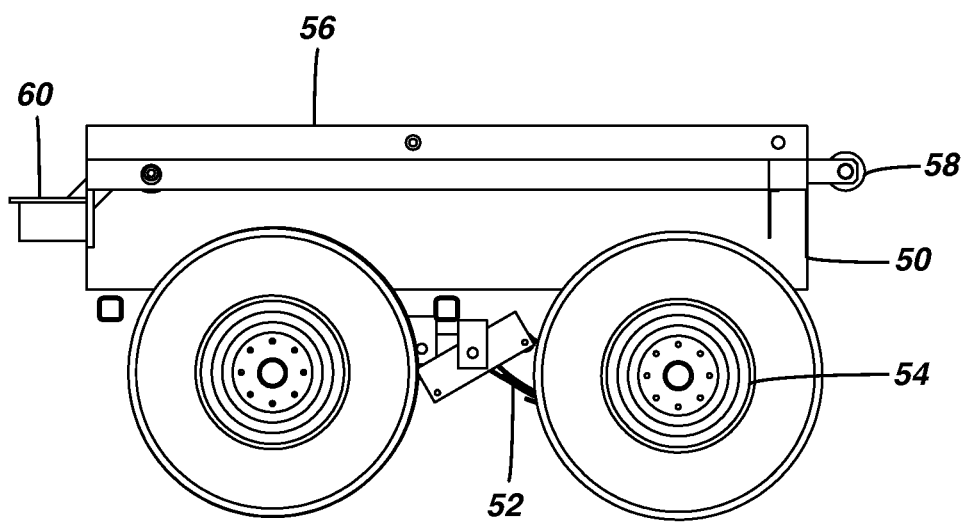

The dolly 16 is shaped to fit under the intermodal container 18 and to support the intermodal container 18 on top of the dolly 16 during transportation of the intermodal container 18. Referring to FIGS. 16-18, the dolly 16 includes a bogie-type frame 50 located on top of a suspension system 52 and attaching a plurality of wheels 54 to the dolly 16. The dolly 16 further includes a pair of brackets 56 mounted on opposing sides of the bogey-type frame 50 for engaging sides of the intermodal container 18 when the dolly 16 is under the intermodal container 18. The dolly 16 may further include a pair of rollers 58 located on sides of the dolly 16 to aid in sliding the dolly 16 under the intermodal container 18 as described herein. A pair of brackets 60 may also be located on an opposite end of the dolly 16 from the rollers 58 for connecting the dolly 16 to the tow assembly 14 when not in use.

Figure 19:
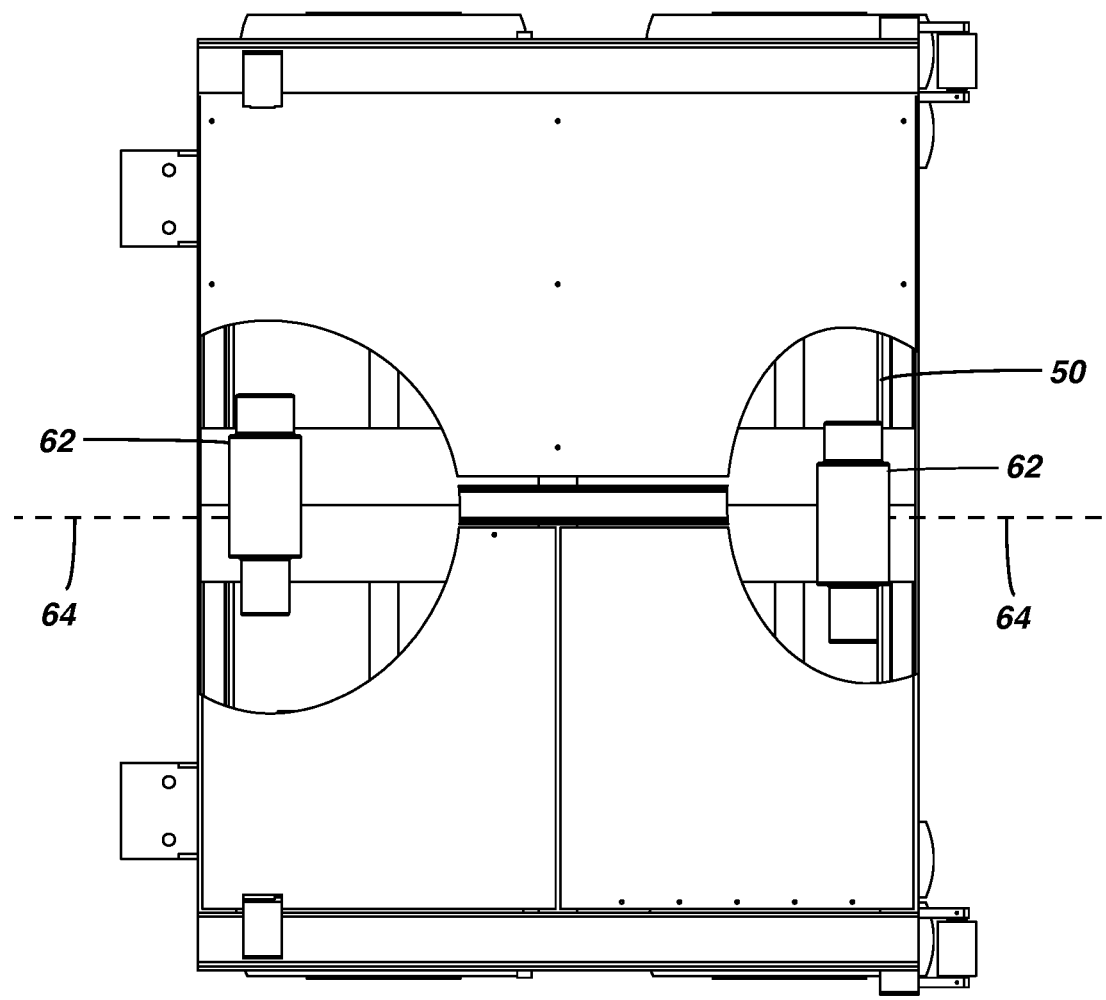

Referring to FIG. 19, the dolly 16 further preferably includes one or more winches 62 mounted on the bogey-type frame 50. The one or more winches 62 may be oriented on the dolly 16 such that a cable 64 of the winches may be attached to one of the intermodal container 18 and tow assembly 14 to move the dolly 16 in relationship to the tow assembly 14 and intermodal container 18.

Referring again to FIGS. 1-4, in a first configuration the tow assembly 14 and dolly 16 are connected to one another and to the vehicle 12 for transportation of the container transport system 10. One or more fasteners may be inserted through the pair of brackets 56 of the dolly 16 to secure the dolly 16 to the tow assembly 14.

Figure 20B:
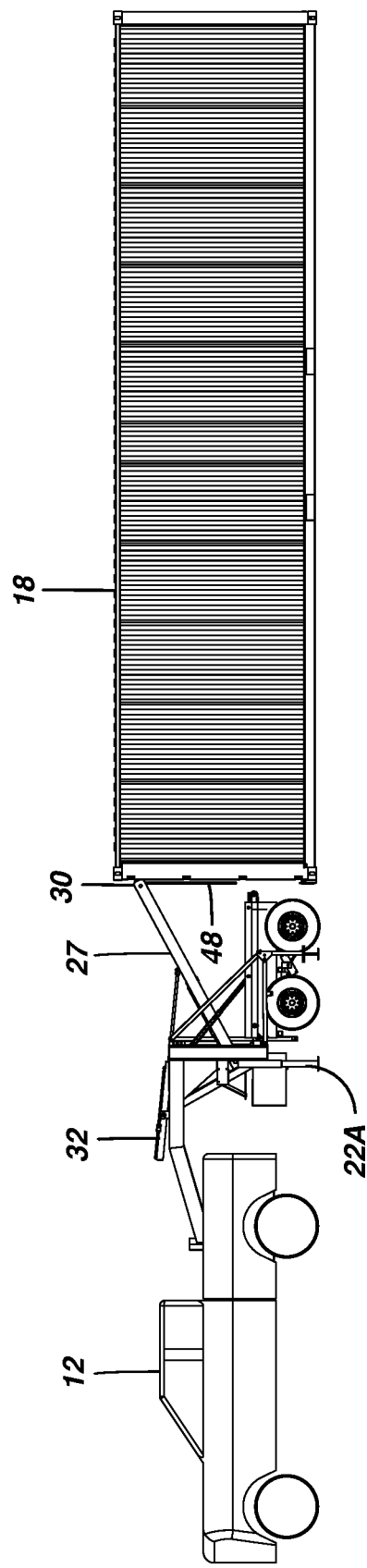

The container transport system 10 is configured to lift an intermodal container from a position wherein the intermodal container is resting on a ground surface onto the dolly 16 and tow assembly 14 for transportation of the intermodal container. Referring first to FIGS. 20A and 20B, the vehicle 12 and connected container transport system 10 may be placed adjacent to an end of the intermodal container 12.

When the container transport system 10 is located adjacent an end of the intermodal container, the boom actuator 32 is extended such that the boom assembly 27 is pivoted towards the intermodal container 18. In the extended position, the second end 30 of the boom assembly 27 extends beyond an end of the dolly 16 and adjacent to the end of the intermodal container. 18. The cable 48 is preferably routed over the pulley shaft 40 and attached to the lifting actuator 36. The lifting actuator 36 is extended to lower the cable 48. The lift beam 42 (FIGS. 13-15) is attached to the end of the intermodal container 18 at a bottom of the intermodal container 18 and is further attached to the cable 48. The outrigger supports 22A and 22B may further be deployed to stabilize the tow assembly 14 during lifting of the intermodal container 18.

Figure 21A:
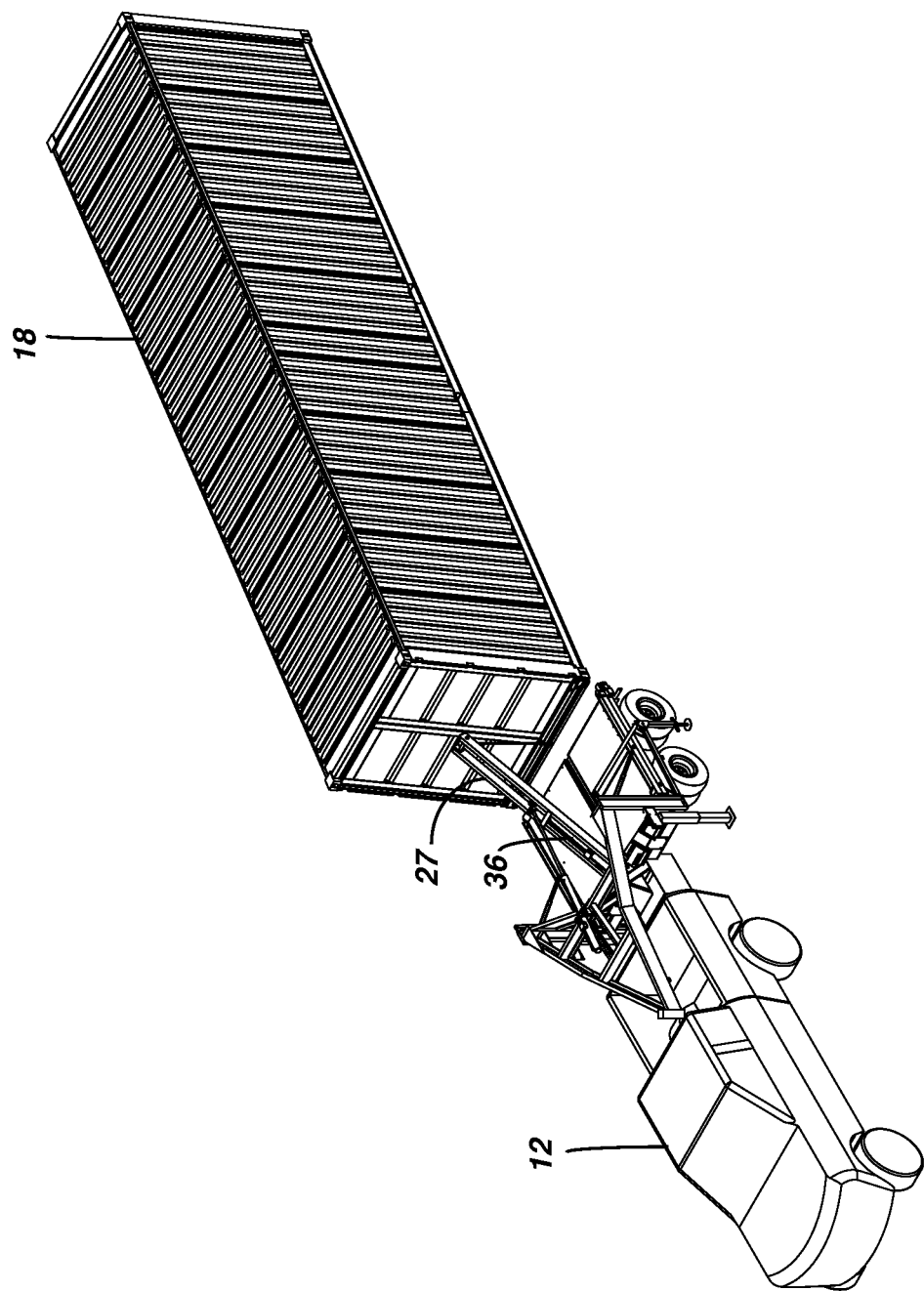
FIGS. 21A and 21B show a second step of loading an intermodal container onto a container transport system according to one embodiment of the present disclosure.
Figure 21B:
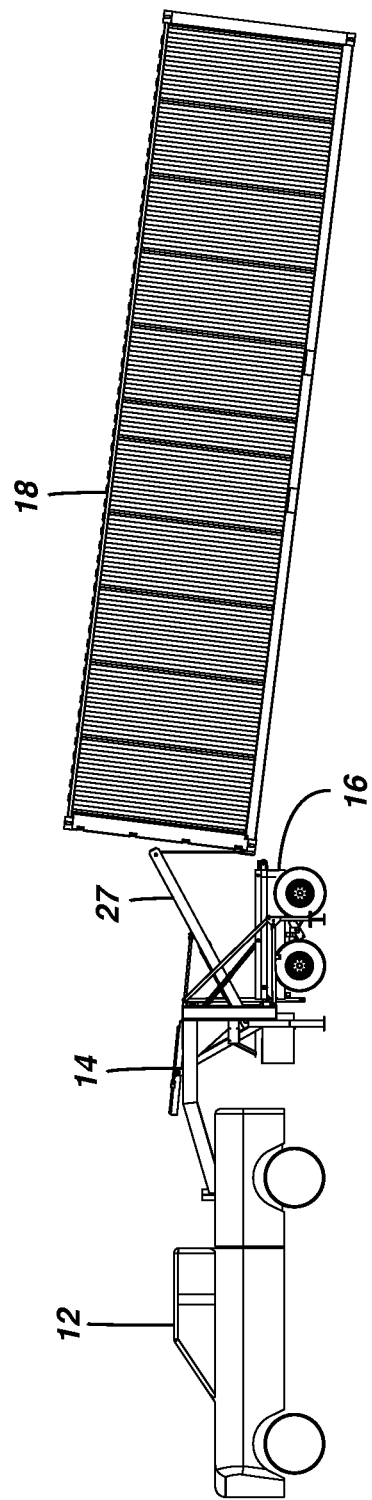

Referring next to FIGS. 21A and 21B, the lifting actuator 36 is retracted, thereby pulling the cable 48 over the second end 30 of the boom assembly 27 and lifting the attached end of the intermodal container 18. The end of the intermodal container 18 is lifted above the dolly 18. After lifting the end of the intermodal container 18, the one or more winches 62 may be attached to an opposite end of the intermodal container 18.

Figure 22A:
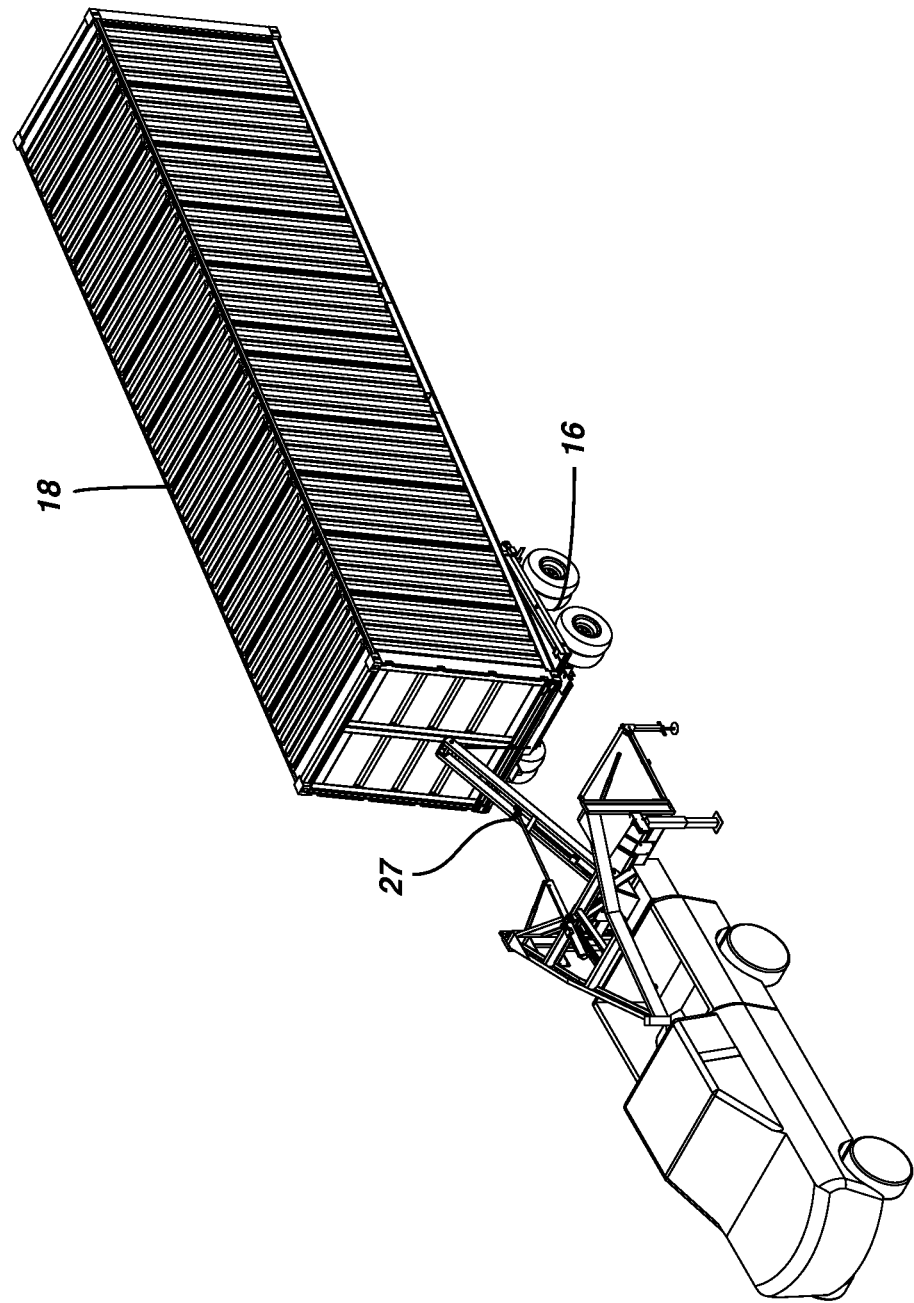
FIGS. 22A and 22B show a third step of loading an intermodal container onto a container transport system according to one embodiment of the present disclosure.
Figure 22B:
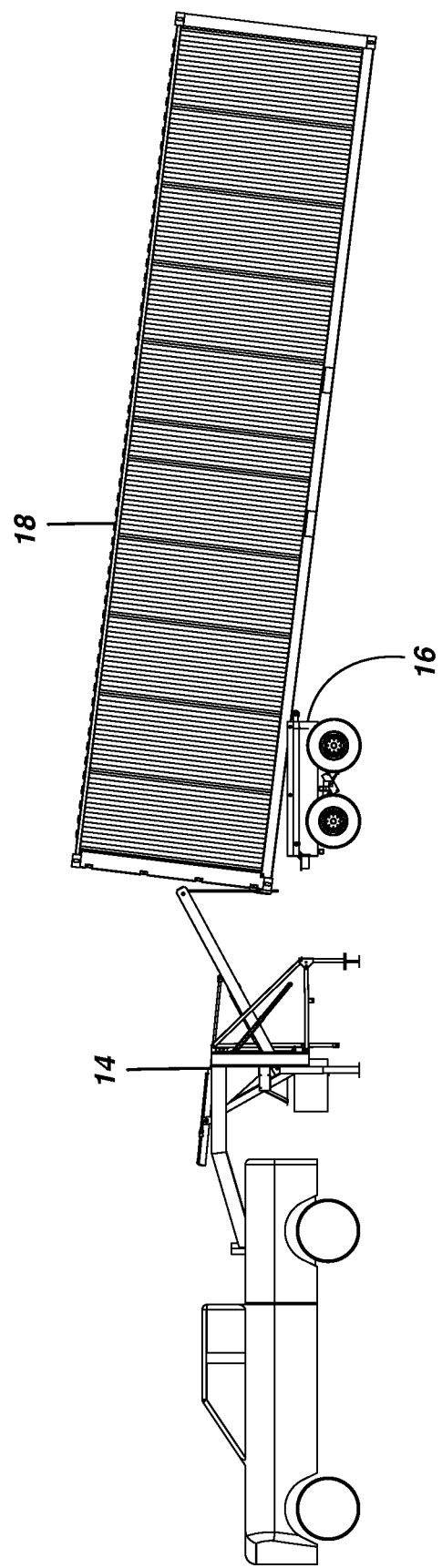
Figure 23A:
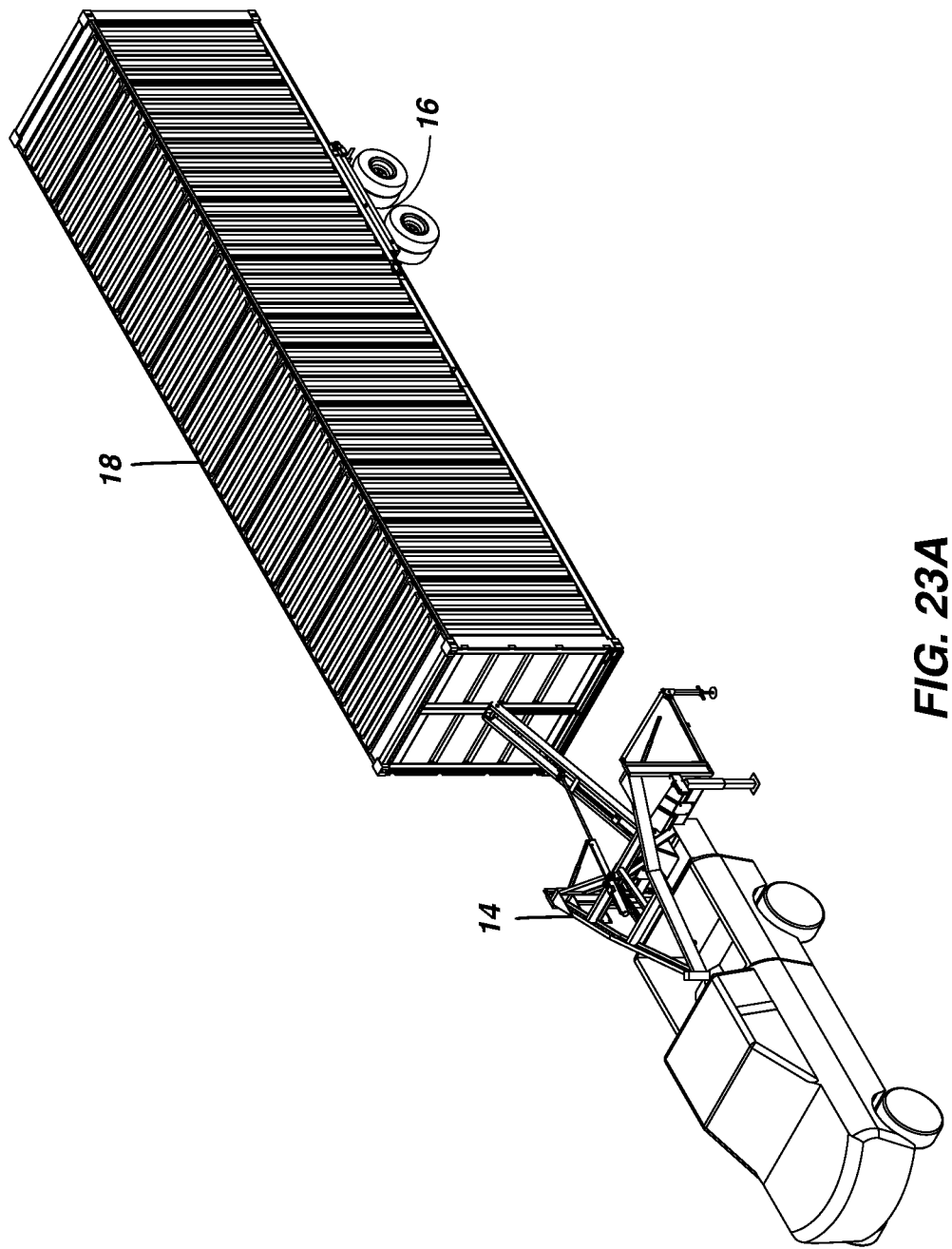
FIGS. 23A and 23B show a fourth step of loading an intermodal container onto a container transport system according to one embodiment of the present disclosure.
Figure 23B:
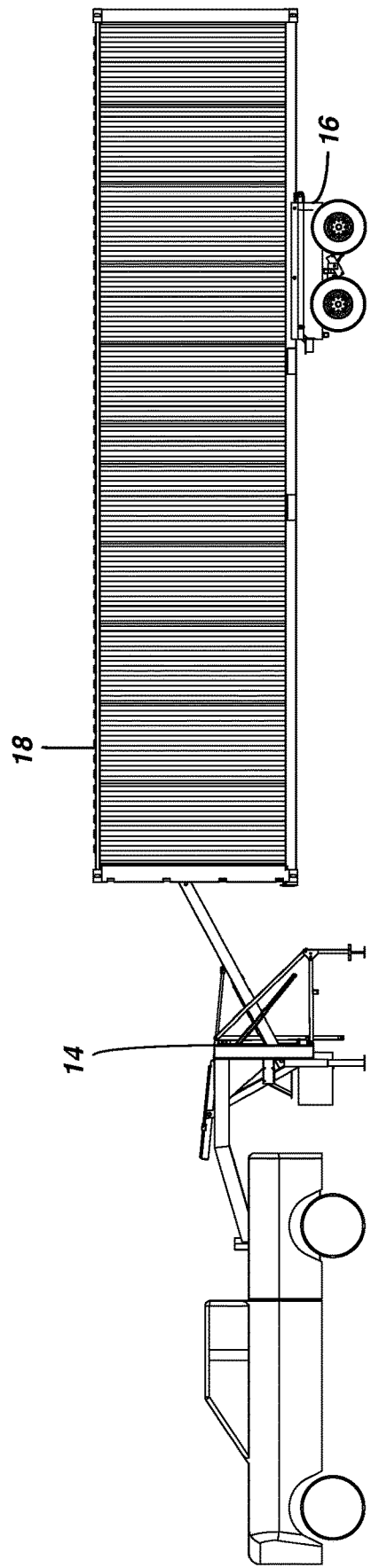

In a next step, the dolly 16 is released from the tow assembly 14 and is drawn towards the opposite end of the intermodal container 18 as shown in FIGS. 22A and 22B. The one or more winches 62 may pull the dolly 16 towards the opposite end of the intermodal container 18 until the dolly 16 reaches a desired position under the intermodal container 18. The pair of rollers 58 of the dolly 16 facilitate movement of the dolly 16 under the intermodal container 18. The dolly 16 is drawn towards a distal end of the intermodal container 18 until the dolly 16 reaches the position shown in FIGS. 23A and 23B. After locating the dolly 16 in the position of FIGS. 23A and 23B, the dolly 16 may be secured to the intermodal container 18 with a clamp 66 (FIG. 16).

The boom actuator 38 is retracted such that the boom assembly 27 is in an upright position and the end of the intermodal container 18 abuts the tow assembly 14 as shown in FIG. 5. An end of the intermodal container rests on the pair of tabs 25 of the tow assembly 14. The pair of outrigger supports 22A and 22B are raised and the intermodal container 18 is substantially ready for transport by the vehicle 12.

Figure 24A:
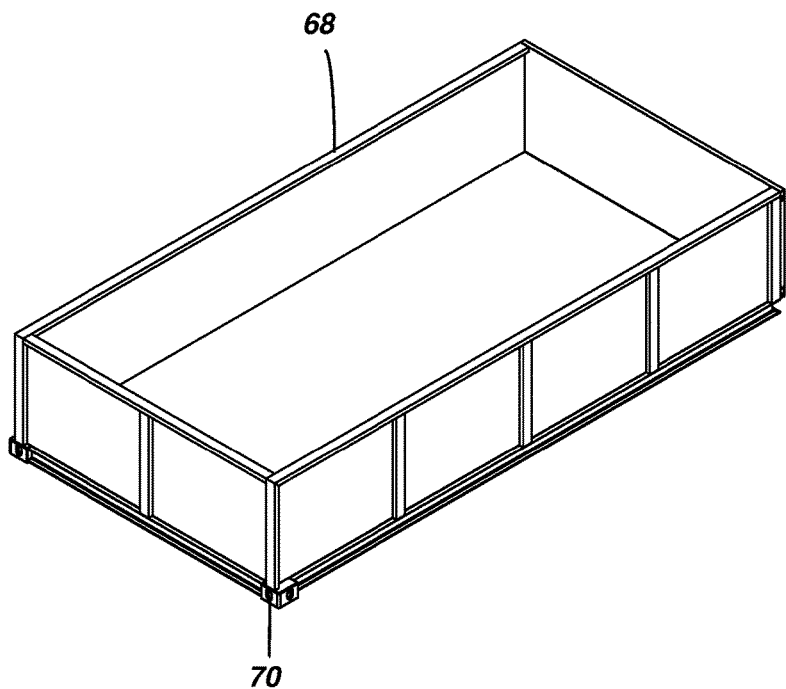
FIGS. 24A and 24B show a dump bed assembly according to one embodiment of the present disclosure.
Figure 24B:
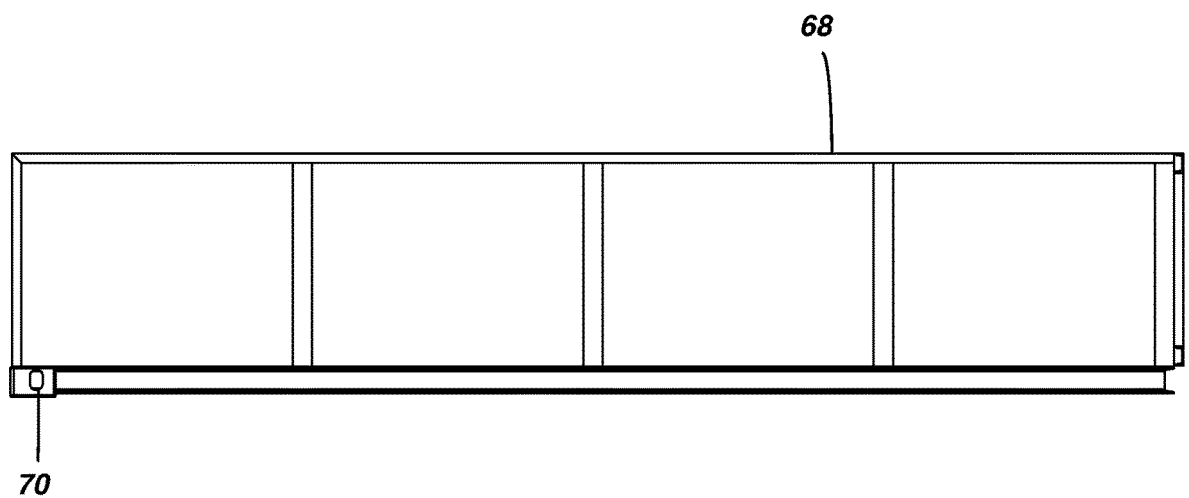
Figure 25A:
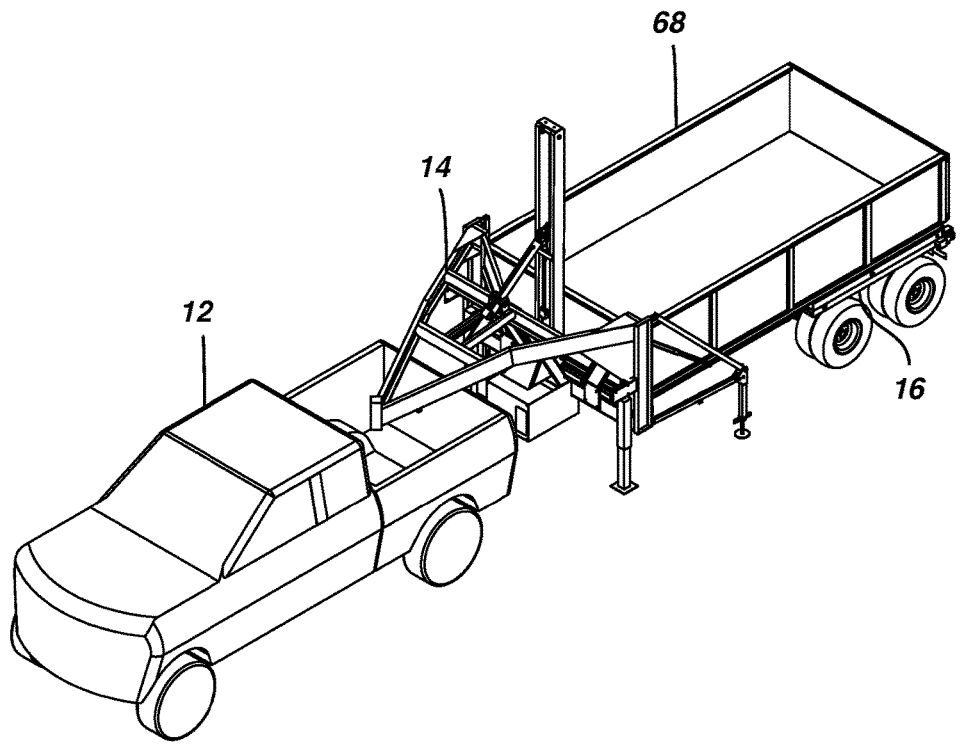
FIGS. 25A and 25B show a dump bed assembly mounted on a container transport system according to one embodiment of the present disclosure.
Figure 25B:
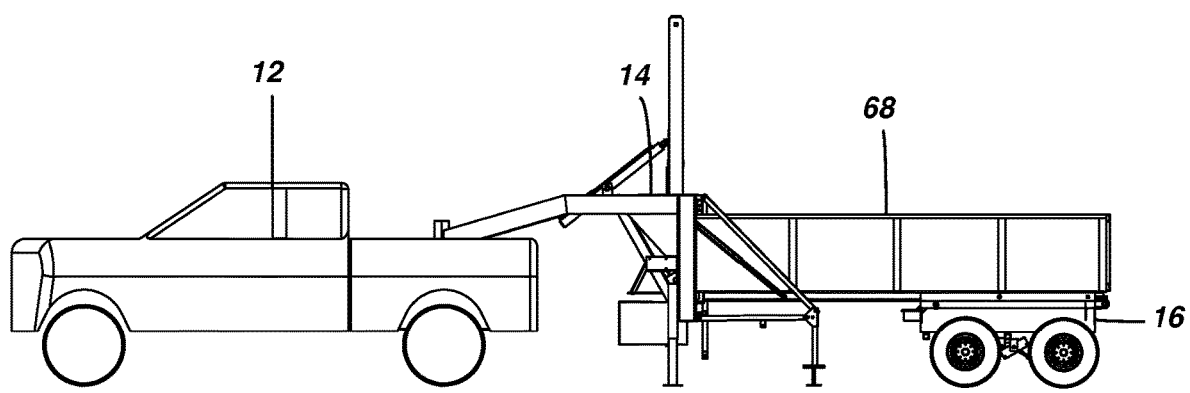

In one embodiment, the container transport system 10 is also configured to transport various attachments, such as a dump bed, flat bed, or other trailer attachments on the tow assembly 14 and dolly 16. For example, as shown in FIGS. 24A and 24B, a dump bed 68 includes a plurality of corner fittings 70 located at corners on a bottom side of the dump bed 68. The corner fittings 70 are shaped similar to corner fittings of the intermodal container 18 such that the container transport system 10 may lift and transport the dump bed 68 as shown in FIGS. 25A and 25B.

Figure 26A:
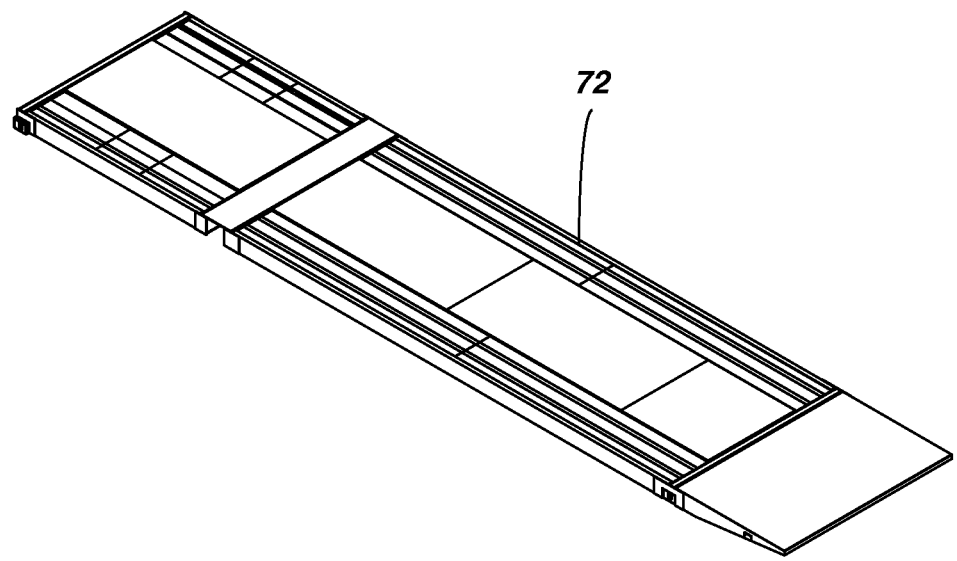
FIGS. 26A-26C show a flatbed assembly according to one embodiment of the present disclosure.
Figure 26B:
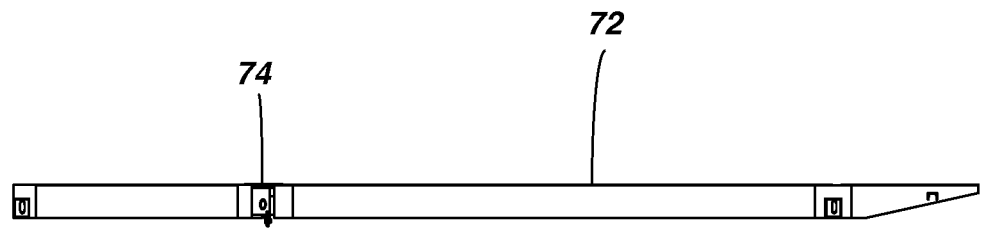
Figure 26C:
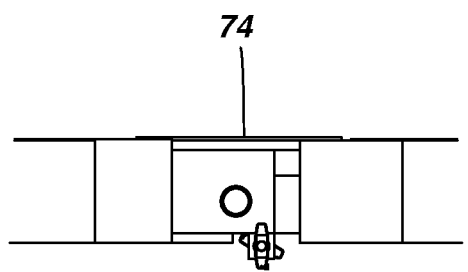
Figure 27A:
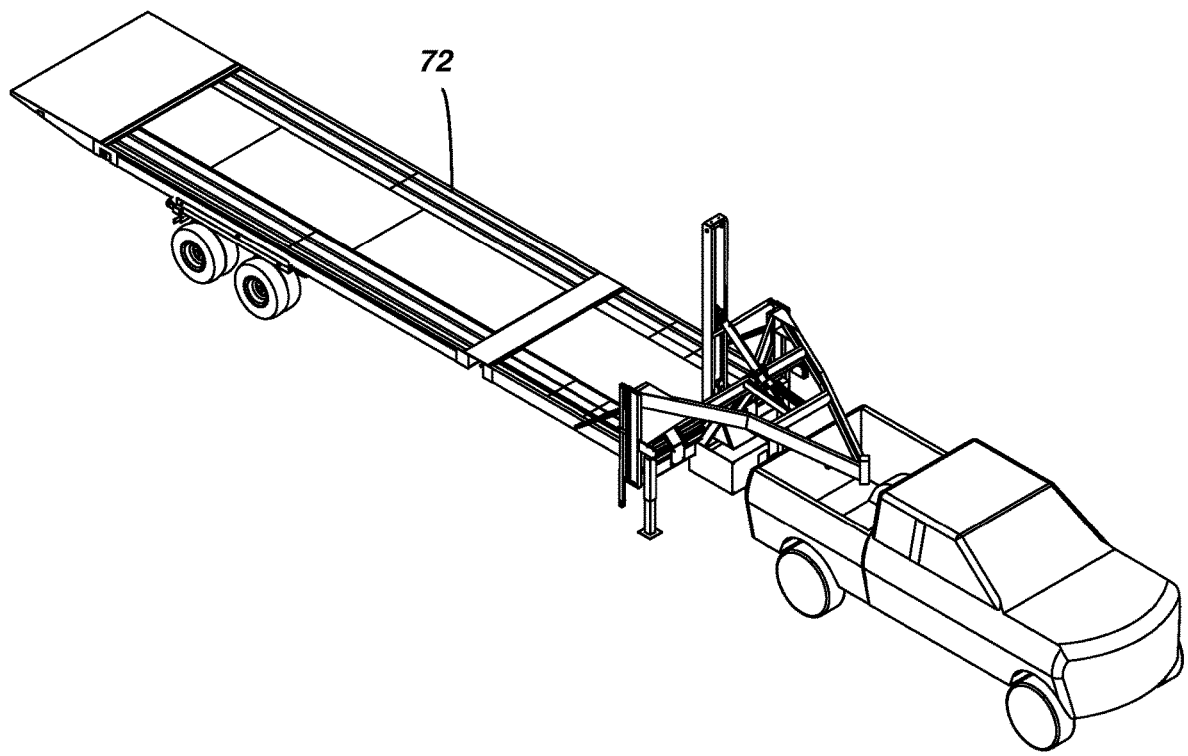
FIGS. 27A and 27B show a flatbed assembly mounted on a container transport system according to one embodiment of the present disclosure.
Figure 27B:
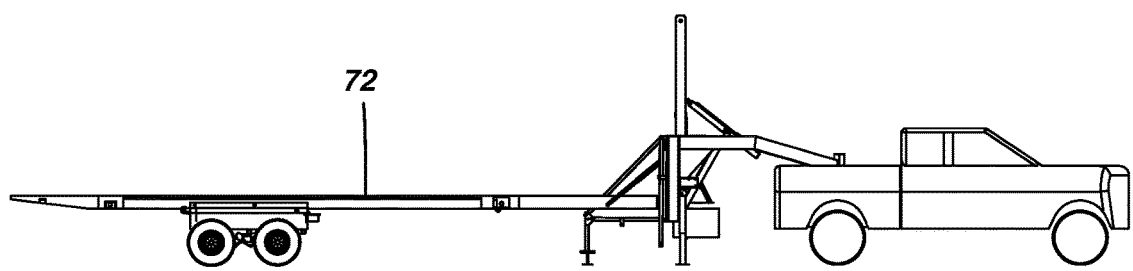

As shown in FIGS. 26A-26C, a flatbed assembly 72 may be adapted for transport by the container transport system 10. The flatbed assembly 72 also preferably includes a plurality of corner fittings 70 oriented similarly to an intermodal container for mounting the flatbed assembly 72 on the dolly 16 and tow assembly 14 (FIGS. 27A and 27B). The flatbed assembly 72 may include a release 74 for hingedly releasing at least a portion of the flatbed assembly 72 such that the flatbed assembly 72 may be tilt-loaded.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A container transport system for transporting an intermodal freight container, the container transport system comprising:
    a tow assembly pivotally coupled to a tow vehicle, the tow assembly including
        a support frame,
        a boom assembly mounted on the support frame, the boom assembly having a boom frame and a lifting actuator mounted on the boom frame;
    a lift beam shaped to attach to an end of the intermodal freight container, the lift beam mechanically associated with the lifting actuator and having a pair of pins located on ends of the lift beam, the pair of pins shaped to engage corner casings of the intermodal freight container;
    a dolly removably coupled to one of the tow assembly and tow vehicle, the dolly including
        a bogey frame including a plurality of wheels attached to the bogey frame,
        a pair of brackets located on sides of the bogey frame, the brackets spaced apart such that a width of the intermodal freight container fits between the paid of brackets, wherein the brackets are shaped to fit engage sides of the intermodal freight container.

2. The container transport system of claim 1, wherein the boom assembly is pivotally mounted on the support frame, the tow assembly further comprising a boom actuator mounted between the support frame and the boom assembly.

3. The container transport system of claim 1, the tow assembly further comprising a gooseneck coupler located on the support frame for engaging a gooseneck hitch of the tow vehicle.

4. The container transport system of claim 1, the tow assembly further comprising a pair of outrigger supports mounted on sides of the support frame for stabilizing the support frame during lifting of the intermodal freight container.

5. The container transport system of claim 4, the tow assembly further comprising a pair of landing legs, wherein the tow assembly is supported by the pair of outrigger supports and the pair of landing legs when not attached to the tow vehicle or the intermodal freight container.

6. The container transport system of claim 1, the boom assembly further comprising a pulley located on a distal end of the boom assembly and a cable attached between the lifting actuator and the lift beam, wherein the cable extends over the pulley.

7. The container transport system of claim 1, the dolly further comprising one or more winches for moving the dolly under the intermodal freight container for transport.

8. The container transport system of claim 1, the dolly further comprising one or more rollers located along a back edge of the dolly for contacting a bottom of the intermodal freight container during loading and unloading of the intermodal freight container.

9. The container transport system of claim 1 further comprising a flatbed assembly having a plurality of corner casings, wherein the flat bed assembly is removably attached to the tow assembly and the dolly.

10. The container transport system of claim 1, further comprising a dump bed assembly having a plurality of corner casings, wherein the dump bed assembly is removably attached to the tow assembly and the dolly.

11. A container transport system for transporting an intermodal freight container, the container transport system comprising:
    a tow assembly pivotally coupled to a tow vehicle, the tow assembly including
        a support frame,
        a boom assembly pivotally mounted on the support frame, the boom assembly having a boom frame, a lifting actuator mounted on the boom frame, a pulley located at a distal end of the boom frame, and a lifting cable attached to the lifting actuator and located around the pulley;
    a lift beam attached to an end of the lifting cable, the lift beam shaped to attach to an end of the intermodal freight container, the lift beam mechanically associated with the lifting actuator;
    a dolly removably coupled to one of the tow assembly and tow vehicle, the dolly including
        a bogey frame including a plurality of wheels attached to the bogey frame,
        a pair of brackets located on sides of the bogey frame, the brackets spaced apart such that a width of the intermodal freight container fits between the paid of brackets.

12. The container transport system of claim 11, the tow assembly further comprising a gooseneck coupler located on the support frame for engaging a gooseneck hitch of the tow vehicle.

13. The container transport system of claim 11, the tow assembly further comprising a pair of outrigger supports mounted on sides of the support frame for stabilizing the support frame during lifting of the intermodal freight container.

14. The container transport system of claim 11, the dolly further comprising one or more winches for moving the dolly under the intermodal freight container for transport.

15. The container transport system of claim 11, the dolly further comprising one or more rollers located along a back edge of the dolly for contacting a bottom of the intermodal freight container during loading and unloading of the intermodal freight container.

16. A container transport system for transporting an intermodal freight container, the container transport system comprising:
   a tow assembly pivotally coupled to a tow vehicle, the tow assembly including
     a support frame,
     a boom assembly pivotally mounted on the support frame, the boom assembly having a boom frame, a lifting actuator mounted on the boom frame, a pulley located at a distal end of the boom frame, and a lifting cable attached to the lifting actuator and located around the pulley;
   a lift beam attached to an end of the lifting cable, the lift beam shaped to attach to an end of the intermodal freight container, the lift beam mechanically associated with the lifting actuator;
   a dolly removably coupled to one of the tow assembly and tow vehicle, the dolly including
     a bogey frame including a plurality of wheels attached to the bogey frame,
     a pair of brackets located on sides of the bogey frame, the brackets spaced apart such that a width of the intermodal freight container fits between the paid of brackets, and
     one or more winches mounted on the dolly for moving the dolly under the intermodal freight container for transport one or more winches mounted on the dolly.

* * * * *